(12) United States Patent
Toscano et al.

(10) Patent No.: US 8,896,869 B2
(45) Date of Patent: *Nov. 25, 2014

(54) SYSTEMS AND METHODS FOR COMMUNICATING DOCUMENTS

(71) Applicant: Xpedite Systems, LLC, Atlanta, GA (US)

(72) Inventors: Francis Toscano, Tinton Falls, NJ (US); Joseph Merces, Tinton Falls, NJ (US); Joachim H. Braun, Tinton Falls, NJ (US); Samuel N. Kamens, Tinton Falls, NJ (US)

(73) Assignee: Xpedite Systems, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,890

(22) Filed: Feb. 6, 2013

(65) Prior Publication Data

US 2013/0148797 A1 Jun. 13, 2013

Related U.S. Application Data

(63) Continuation of application No. 11/852,315, filed on Sep. 9, 2007, now Pat. No. 8,395,795.

(51) Int. Cl.
*G06F 3/12* (2006.01)
*H04N 1/00* (2006.01)
*H04N 1/32* (2006.01)
*H04L 12/58* (2006.01)

(52) U.S. Cl.
CPC ............. *H04N 1/32* (2013.01); *H04N 1/00214* (2013.01); *H04L 51/14* (2013.01); *H04N 2201/0094* (2013.01); *H04N 1/00212* (2013.01); *H04N 1/0022* (2013.01); *H04L 51/08* (2013.01); *H04L 51/066* (2013.01)
USPC .......... 358/1.15; 358/402; 358/407; 358/468; 379/100.08; 379/100.01

(58) Field of Classification Search
None
See application file for complete search history.

(56) References Cited

U.S. PATENT DOCUMENTS

| 6,020,980 | A * | 2/2000 | Freeman ..................... 358/402 |
| 6,043,904 | A * | 3/2000 | Nickerson ................... 358/442 |
| 6,321,267 | B1 * | 11/2001 | Donaldson .................. 709/229 |
| 6,981,023 | B1 * | 12/2005 | Hamilton et al. ............ 709/206 |
| 2003/0112472 | A1 * | 6/2003 | Eguchi et al. ................ 358/402 |
| 2005/0179961 | A1 * | 8/2005 | Czyszczewski et al. ...... 358/468 |

* cited by examiner

*Primary Examiner* — Paul F Payer
(74) *Attorney, Agent, or Firm* — King & Spalding LLP

(57) ABSTRACT

A system includes telephone and packet-switched network interfaces and a translator. The translator receives messages. Outgoing messages originate from a multiple-function peripheral (MFP) and are received via a transfer agent (TA). Outgoing e-mail messages include an attached file in an image file format. The translator removes and delivers the attachment in facsimile format. Incoming fax messages are attached to an e-mail message. The TA receives and relays the e-mail message to an identified MFP, which discards the e-mail message and prints the attachment. A method for processing fax messages includes associating an identifier with a MFP, receiving a fax intended for the MFP, generating an e-mail message with an attachment representing the fax and communicating the e-mail message to a transfer agent that relays the e-mail to the MFP, which discards the e-mail body and prints the attachment.

9 Claims, 6 Drawing Sheets

SYSTEMS AND METHODS FOR COMMUNICATING DOCUMENTS

CROSS REFERENCE TO RELATED APPLICATIONS

The present application is a continuation under 35 U.S.C. §120 of U.S. Non-provisional patent application Ser. No. 11/852,315, filed on Sep. 9, 2007. The entire contents of the foregoing priority application is hereby incorporated herein by reference.

BACKGROUND OF THE INVENTION

Facsimile (fax) technology has been a successful means to transmit documents electronically. With the emergence of publicly accessible data networks and electronic mail (e-mail) applications, it appeared as though that fax communications would be rapidly replaced by e-mail. However, it is now clear that the two technologies will co-exist for a while.

In a deployment of fax machines in an office environment equipped with Internet access, a fax server is connected to the public switched telephone network (PSTN) by one or more dedicated lines, such as T1/E1. As observed from the perspective of the fax server, the PSTN is both the source of incoming faxes as well as the destination for outgoing faxes. The fax server is also connected to a packet-switched network, which provides connections to users. In this way, the fax server provides desktop faxing capabilities via various e-mail applications. The fax server can also used to provide fax-back transaction confirmation, fax broadcasting or automated form processing.

The fax server uses specialized interface circuits for converting the fax information communicated by the users. When a document arrives at the fax server, the fax server converts the document into a format that is suitable for transmission over the PSTN. Thereafter, the fax server sends the converted document over the PSTN via its dedicated interface circuits. Conversely, for a fax arriving at the fax server, the fax server identifies the destination user, converts the incoming fax transmission into a format suitable for delivery to the destination user, and sends the converted document to the destination user over the internal IP network.

In a common enterprise, the users are not only connected to the fax server via the internal internet protocol (IP) network, but are also connected to an internetworking gateway, which connects the internal IP network to the Internet. The gateway allows a user to communicate electronically with other parties connected to the Internet. Such electronic communications may include store-and-forward messages (e.g., e-mail), real time one-way communications (e.g., live TV), real time two-way communications (e.g., Internet telephony, etc.).

The gateway is typically connected to an Internet Service Provider (ISP). The connection between the gateway and the ISP or the PSTN is typically established via dedicated T1/E1 lines or in some cases optical fiber, similar to the connection between the fax server and the PSTN.

It is apparent that a first set of dedicated T1/E1 lines are required to provide fax functionality and a second set of dedicated T1/E1 lines or other data transmission media are required to provide Internet access. The use of two sets of dedicated data transmission media is expensive to maintain and, moreover, it is possible to experience the situation in which either set of lines is idle while the other set is being used at its maximum capacity. In such a situation, the capacity of the underused set of lines goes to waste. The requirement for dedicated hardware for interfacing with the PSTN translates into a further non-negligible expense for the enterprise.

Multiple-function peripheral devices enable various combinations of fax, print, copy, and scan-to-store functionality to end users. The manufacturers of these multiple-function peripherals have also successfully integrated the functionality of scanning and communicating a document as an attachment in an e-mail message by integrating network interfaces or adapters. These systems require an operator of the multiple-function peripheral to enter a destination e-mail address. Even when the destination address has been entered and stored in an electronic address book, accessing the address book, locating and selecting the destination address is time consuming.

Accordingly, it would be desirable to develop systems and methods that overcome these shortcomings in the integration and flexibility of fax and e-mail functionality.

SUMMARY

Systems and methods that communicate documents from a multiple-function peripheral (MFP) via an e-mail application, data network and a fax server are invented and disclosed. The MFP is used in a fax emulation or local area network fax mode to scan and convert a source document into an image format file. A destination phone number entered by a user of the MFP is used by a mail transfer agent (MTA) to generate a destination address. The MTA generates a source address in accordance with identifying information extracted from the MFP. In addition, the MTA inserts message processing controls as may be desired into the subject line of an e-mail message. The image file format version of the source document is added as an attachment and communicated from the MTA to the fax server as an e-mail message. The fax server identifies and applies the message processing controls to the attachment to generate an outgoing PSTN fax. The fax server delivers the outgoing PSTN fax to the destination phone number.

In one aspect of the present invention, a method for communicating documents is provided. The method includes the steps of: (1) receiving an image file from a multiple-function peripheral emulating a facsimile mode, where the multiple-function peripheral provides identifying information, and public-switched telephone network information; (2) generating an e-mail message including the identifying information, the public-switched telephone network information, and an image format file in an attachment; (3) generating a destination address compatible with a data network from information provided in the e-mail message; (4) communicating, to a server, the e-mail message with the destination address and at least one instruction for processing the attachment as an outgoing facsimile; and (5) returning a delivery confirmation of the outgoing facsimile using the identifying information.

In another aspect of the present invention, a method for processing documents is provided. The method includes the steps of: (1) associating a destination identifier with a multiple-function peripheral coupled to a data network; (2) receiving a facsimile format message intended for the multiple-function peripheral as defined by the destination identifier; (3) generating an e-mail message with an image format file in an attachment, the attachment including an electronic representation of the facsimile format message; (4) communicating the e-mail message to an e-mail server; and (5) forwarding the e-mail message to the multiple-function peripheral in response to a periodic request from the multiple-function peripheral.

In yet another aspect of the present invention, a system for communicating documents is provided. The system includes: a public-switched telephone network (PSTN) interface in communication with the PSTN; a packet-switched network interface communicatively coupled to a simple mail transfer protocol server via a message transfer agent; and a translator communicatively coupled to the PSTN interface and the packet-switched network interface, the translator configured to receive outgoing e-mail messages originating from a multiple-function peripheral via the message transfer agent, the outgoing e-mail messages including identifying information and having an image format file in an attachment, the translator further configured to remove and deliver the attachment in a facsimile format in accordance with one or more encoded commands in the outgoing email message and deliver a confirmation using the identifying information.

Other devices, methods, features and advantages will be or will become apparent to one skilled in the art upon examination of the following figures and detailed description. All such additional devices, methods, features and advantages are defined and protected by the accompanying claims.

BRIEF DESCRIPTION OF DRAWINGS

The present systems and methods for communicating documents, as defined in the claims, can be better understood with reference to the following drawings. The components within the drawings are not necessarily to scale relative to each other; emphasis instead is placed upon clearly illustrating the elements, features and principles involved in supporting the transfer of documents to and receiving documents from a multiple-function peripheral device

DETAILED DESCRIPTION

Figure 1:
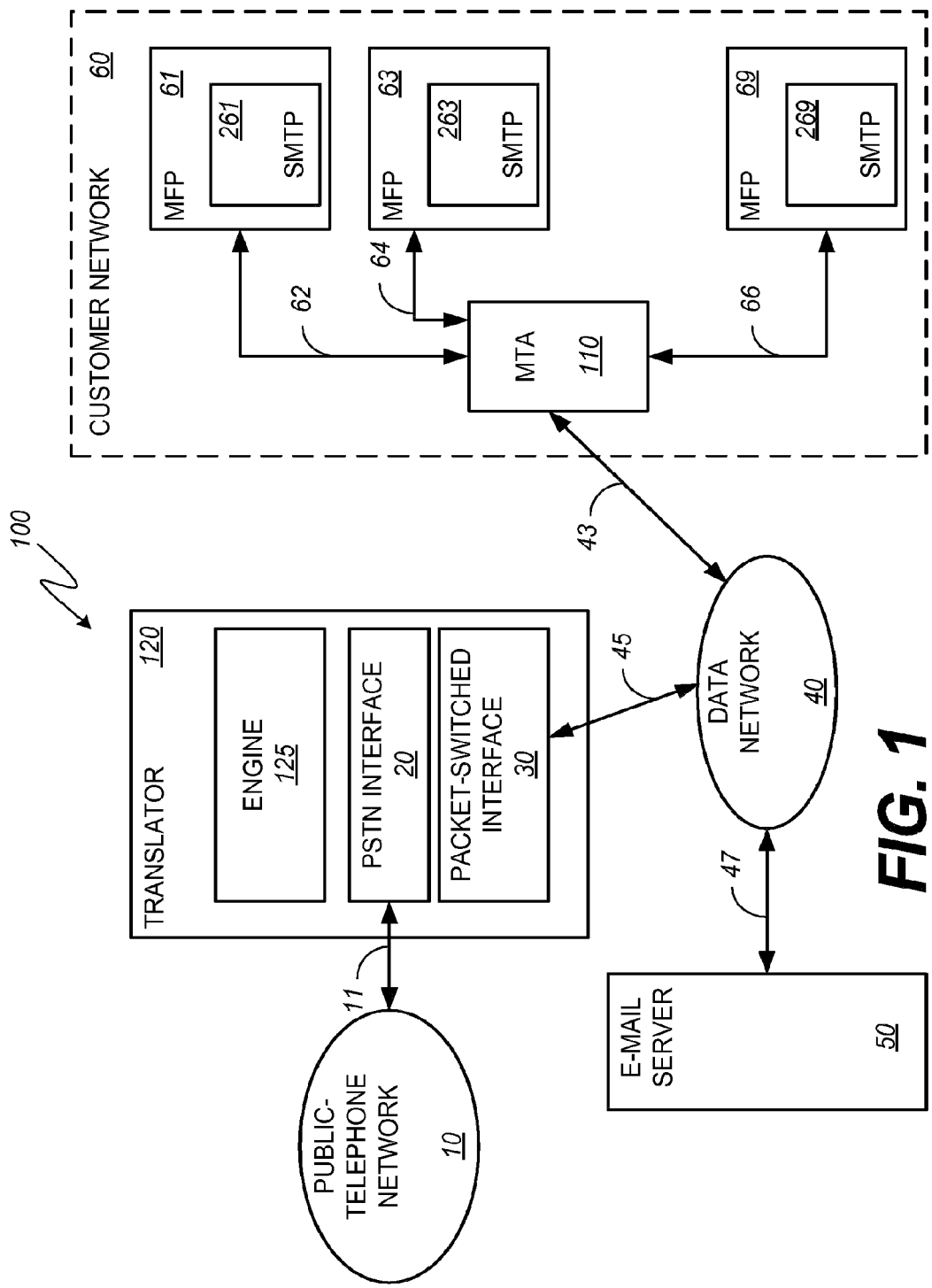
FIG. 1 is a functional block diagram illustrating an embodiment of an example network environment.

Systems and methods that communicate documents are invented and disclosed. A multiple-function peripheral (MFP) coupled to a data network sends and receives fax messages absent fax modems and the PSTN. Fax messages are received at a fax server or translator. The translator converts and appends the received PSTN facsimile to an image format file as an e-mail message or extracts the image format file information and appends the same in an e-mail attachment. Both tagged image file format (TIFF) and portable document format (PDF) are supported. In an alternative embodiment, the received fax is converted into commands using a printer command language (PCL). The PCL commands are directed to the destination MFP, which generates a hard-copy representation of the fax in accordance with the commands. The e-mail message with the attached fax message is forwarded via one of two methods. The methods are selectable depending on user preference.

The first method forwards the e-mail message from the translator to an e-mail server where the message is stored until application software operable on the destination MFP requests the stored e-mail message using an e-mail account assigned to the MFP. The application software receives the e-mail message with the attached fax, discards the e-mail message and prints the fax. In some embodiments, the MFP alerts a designated individual that a fax has been printed. Otherwise, the fax is available in the output bin for pickup and distribution to an addressee or for designated distribution.

The second method uses an e-mail delivery agent within the translator to forward the e-mail message to a message transfer agent (MTA). The e-mail delivery agent uses the destination phone number extracted from the PSTN fax to identify a destination domain. The e-mail delivery agent performs a domain name system (DNS) lookup for information associated with the identified destination domain. A mail exchange (MX) record provided by a client of a fax service is used to identify a mail server for processing the message. The MTA relays the e-mail message in accordance with the client's internal DNS mechanism. In one embodiment, a specific device name is used. In other embodiments, a client specific (internal) IP address is used to route the e-mail message to an SMTP server in the designated MFP. When more than one mail exchange record is included with the e-mail message, the mail exchange records can be prioritized with a preference number that indicates the order in which the MFPs should be used. This enables the use of primary and backup MFPs for processing the fax. Again, the MFP receives the e-mail message with the attached fax, discards the e-mail message and prints the fax. As described above, the MFP can be configured to alert a designated individual that a fax is available at the MFP. The designated individual need not be an addressee listed on the fax.

The MFP scans an outgoing document in fax emulation or local area network fax mode. The operator of the MFP enters a destination phone number just as with a fax machine. However, instead of using a fax modem and the PSTN at the customer premise to communicate the fax message to its intended recipient, the present system converts the scanned document into an image format file that is attached to an e-mail message addressed to a fax service or translator. Again, both TIFF and PDF are supported. No additional address information is required from the operator of the MFP. The MTA, which can be integrated in the MFP, or enabled in a local-area network coupled device can be configured to provide one or more encoded commands in the generated e-mail message. The MTA generates a source address in accordance with identifying information extracted from the MFP. The translator identifies and applies the encoded commands to the attachment to generate an outgoing fax. The outgoing fax is transmitted via the PSTN to the destination phone number. A delivery confirmation is returned to the sending or originating MFP via the e-mail server or MTA. The delivery confirmation may be sent as an e-mail message or as an attachment to an e-mail message.

In one embodiment, a user identifier is associated with the outgoing fax instead of or in addition to the MFP specific identifier. When this is the case, the system can use the user identifier when generating the fax coversheet and when returning a confirmation. In this embodiment, a fax confirmation can be forwarded to a particular user's e-mail account rather than or in addition to the MFP that was used to scan the document. A user identifier can be communicated to the MFP in multiple ways. For example, a card reader can be used to scan information available on an employee identification card, a radio frequency receiver can be used to scan radio-frequency identifiers from passive or active tags that can be incorporated in an employee identification card, or a user specific code can be entered via the user interface on the MFP. Preferably, the MFP or an external MTA will have a lookup table that can be used to determine the user of the MFP. The translator can use the user information to forward the confirmation message to the specified user.

Having generally described operation of the systems and methods for communicating documents, various additional embodiments will be described with respect to FIGS. 1-6. FIG. 1 is a functional block diagram illustrating an embodiment of an example network environment. Network environment 100 includes PSTN 10, data network 40 and customer network 60. Translator 120 is coupled to PSTN 10 via link 11 and data network 40 via link 45. An e-mail server 50 is coupled to data network 40 via link 47. Customer network 60 is coupled to data network 40 via link 43.

E-mail server 50 is a data network coupled MTA or system of MTAs, used to route e-mail and serve e-mail, by storing e-mail messages and supporting customer access using post-office protocol (POP), internet message access protocol (IMAP) or other protocols.

Translator 120 includes PSTN interface 20, packet-switched interface 30 and engine 125. PSTN interface 20 makes the necessary data and signal translations to send and receive data including fax signal transmissions via PSTN 10. Similarly, packet-switched interface 30 makes the necessary data and signal translations to send and receive data packets via data network 40. Engine 125 includes a processor and memory (not shown) to enable processing of incoming and outgoing fax documents.

Customer network 60 includes MTA 110, MFP 61, MFP 63 and MFP 69. The number of MTAs and MFPs within customer network 60 may be expanded as desired to meet the fax communication and printing needs of the supported enterprise. MFP 61 is coupled to MTA 110 via link 62. MFP 63 is coupled to MTA 110 via link 64. MFP 69 is coupled to MTA 110 via link 66. In turn, MTA 110 is coupled to data network 40 via link 43. MTA 110 receives and relays incoming e-mail messages and associated attachments in accordance with the customer network's domain name system, which assigns an Internet protocol address to each physical device coupled to customer network 60. In addition, MTA 110 generates an e-mail message with an image format file attachment and forwards the e-mail message in accordance with the phone number entered by a user of one of MFP 61, MFP 63 and MFP 69. MTA 110 will include one or both of an MFP identifier and a user identifier in the generated e-mail message.

It is important to note that the network environment 100 illustrated in FIG. 1 is not the only contemplated embodiment. For example, either or both of the translator 120 and the e-mail server 50 may be implemented within and under the management and control of customer network 60. In addition, a single MTA 110 is illustrated in communication with MFP 61, MFP 63 and MFP 69 within customer network 60. Alternatively, the MTA functionality can be implemented within application software and/or firmware operable within each of MFP 61, MFP 63 and MFP 69 such as with SMTP server 261, SMTP server 262 and SMTP server 269. It should be further understood that each of the illustrated communication links with data network 40, such as link 43, link 45 and link 47 or internal links within customer network 60, such as link 62, link 64 and link 66 may be partially or entirely enabled wirelessly.

Figure 2:
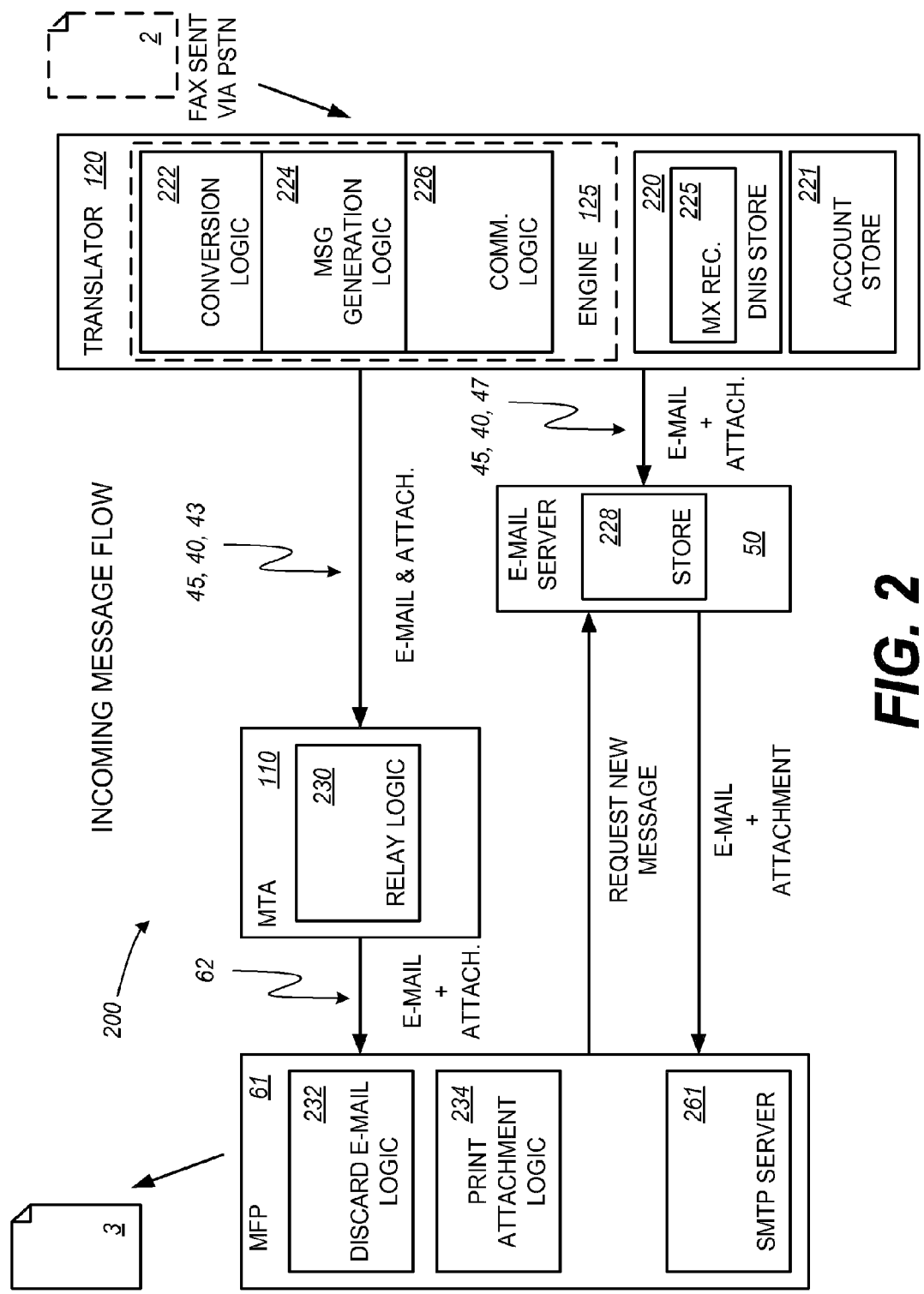
FIG. 2 is a functional block diagram illustrating inbound fax message processing through the network environment of FIG. 1

FIG. 2 is a functional block diagram illustrating inbound fax message processing through the network environment 100 of FIG. 1. Diagram 200 illustrates the processing of an incoming fax message from right to left across the figure. As shown in FIG. 2, fax message 2 is received by translator 120, which generates an e-mail message and translates the fax format message into an image format file attachment. The generated e-mail message with the attachment is communicated to MTA 110 or e-mail server 50, which forward the e-mail message and the attachment to the designated MFP (e.g., MFP 61). In turn, MFP 61 generates a hard copy representation 3 of the fax message 2 from the received attachment. As described above, the attachment includes one or more files in PDF or TIFF. Alternatively, the attachment includes PCL commands that instruct the MFP in rendering a representation of the inbound fax.

Engine 125 includes software and or firmware that detects and processes a received fax message. That is, engine 125 includes conversion logic 222, message generation logic 224 and communication logic 226. Conversion logic 222 is configured to convert the fax format message into an image format file. In this regard, conversion logic 222 can be configured to convert the fax into a TIFF or a PDF file. Message generation logic 224 is configured to generate an e-mail message addressed to the intended recipient of the fax message and attach the image format file. Message generation logic 224 uses information from dialed number identification service (DNIS) store 220 as well as account store 221 to address the message. DNIS store 220 includes information that is used by the message generation logic 224 to direct an inbound fax message to the appropriate e-mail address. In the illustrated embodiment, a client generated MX record 225 includes information that can be used to direct the e-mail message either to e-mail server 50 or to MTA 110. Account store 221 includes a unique phone number and e-mail address for each MFP (e.g., MFP 61) in the system. Communication logic 226 forwards an appropriately configured e-mail message and the attachment to MTA 110 via link 45, link 40 and link 43. Alternatively, communication logic 226 sends the e-mail message and the attachment to an e-mail account enabled by e-mail server 50 via link 45, link 40 and link 47.

When the MTA 110 receives the e-mail message and attachment, relay logic 230 interprets the name of the destination MFP and uses a local DNS mechanism to identify the local IP address. Once, the local IP address is identified, MTA 110 forwards the e-mail message and attachment accordingly. In the illustrated embodiment, the e-mail message and the attachment are designated for delivery to MFP 61 via link 62. Otherwise, in accordance with a configured parameter, SMTP server 261, operable on the MFP 61, periodically sends a request to e-mail server 50 to forward e-mail messages in store 280 that are addressed to MFP 61. In response, e-mail server 50 forwards the appropriately addressed e-mail messages from store 228, along with their attachments to SMTP server 261.

In addition to SMTP server 261, MFP 61 includes software and or firmware that processes a received e-mail message. That is, MFP 61 includes discard e-mail logic 232 and print attachment logic 234. Discard e-mail logic 232 strips the attachment from its host e-mail message. Print attachment logic 234 renders the information in the image format file into a hard-copy representation 3 of the received fax message 2.

Figure 3:
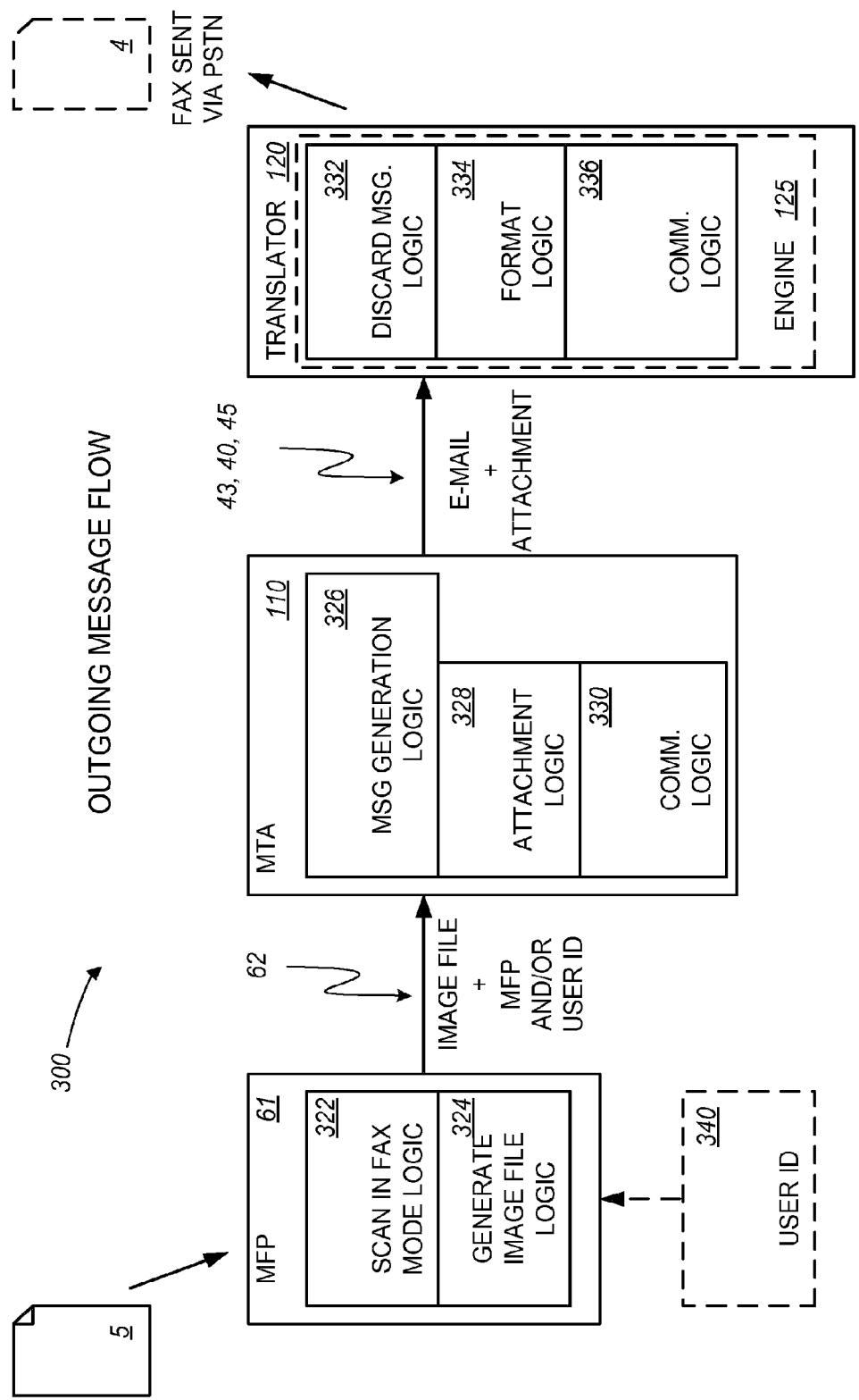
FIG. 3 is a functional block diagram illustrating outbound fax message processing through the network environment of FIG. 1.

FIG. 3 is a functional block diagram illustrating outbound fax message processing through the network environment 100 of FIG. 1. Diagram 300 illustrates the processing of an outbound fax message from left to right across the figure. As shown in FIG. 3, source document 5 is received by MFP 61, which scans the document in fax mode and generates an image file. The image file and identifying information are communicated to MTA 110. In turn, MTA 110 receives the image file and identifying information and generates an e-mail message with an attachment, which is communicated to translator 120 for further processing. Translator 120 received the e-mail message and translates the image format file into a fax format information stream. Additional logic in translator 120 determines whether a cover sheet should be added and in accordance with a previously store configuration or encoded commands in the e-mail message formats the cover sheet. Thereafter, the fax format information stream and any cover sheet information is communicated via PSTN 10 to deliver fax message 2 to the intended fax device.

MFP 61 includes software and or firmware that processes a document. That is, MFP 61 includes scan in fax mode logic 322 and generate image file logic 324. Scan in fax mode logic 322 receives a destination phone number and captures an image of each page of the document 5. Generate image file logic 324 converts the captured image into a image format file. As further illustrated in FIG. 3, MFP 61 can be configured to receive user identifier 340. As described above, a user identifier can be communicated by any number of various mechanisms. The user identifier can be entered via a user interface on MFP 61. The user identifier can be received via a passive or active radio-frequency identification tag worn or otherwise attached to an operator of the MFP 61. In addition, the user identifier can be received from a badge scanner coupled to the MFP 61. Regardless of the mechanism for communicating the user identifier, MFP 61 communicates the image file and the MFP identifier and/or user identifier via link 62 to MTA 110.

MTA 110 includes software or firmware that further processes a document. In this regard, MTA 110 includes message generation logic 326, attachment logic 328 and communication logic 330. Message generation logic 326 creates an e-mail message. The e-mail message includes a "to" field entry with the destination phone number inserted as a prefix concatenated to a server name and an extension of an e-mail account associated with translator 120. Attachment logic 328 appends or otherwise associates the image file as an attachment to the created e-mail message. Communication logic 330 sends the generated e-mail message and the attachment to translator 120 via link 43, link 40, and link 45.

Engine 125 within translator 120 includes software and or firmware that detects and processes a received e-mail message. That is, engine 125 includes discard message logic 332, format logic 334 and communication logic 226. Discard message logic 332 removes the attachment from the received e-mail message. Format logic 334, in accordance with one or more encoded commands in the e-mail message adds and appropriately formats a cover sheet to be sent with the fax message. Communication logic 226 forwards appropriately translated fax format information via PSTN 10 to the destination phone number.

Figure 4:
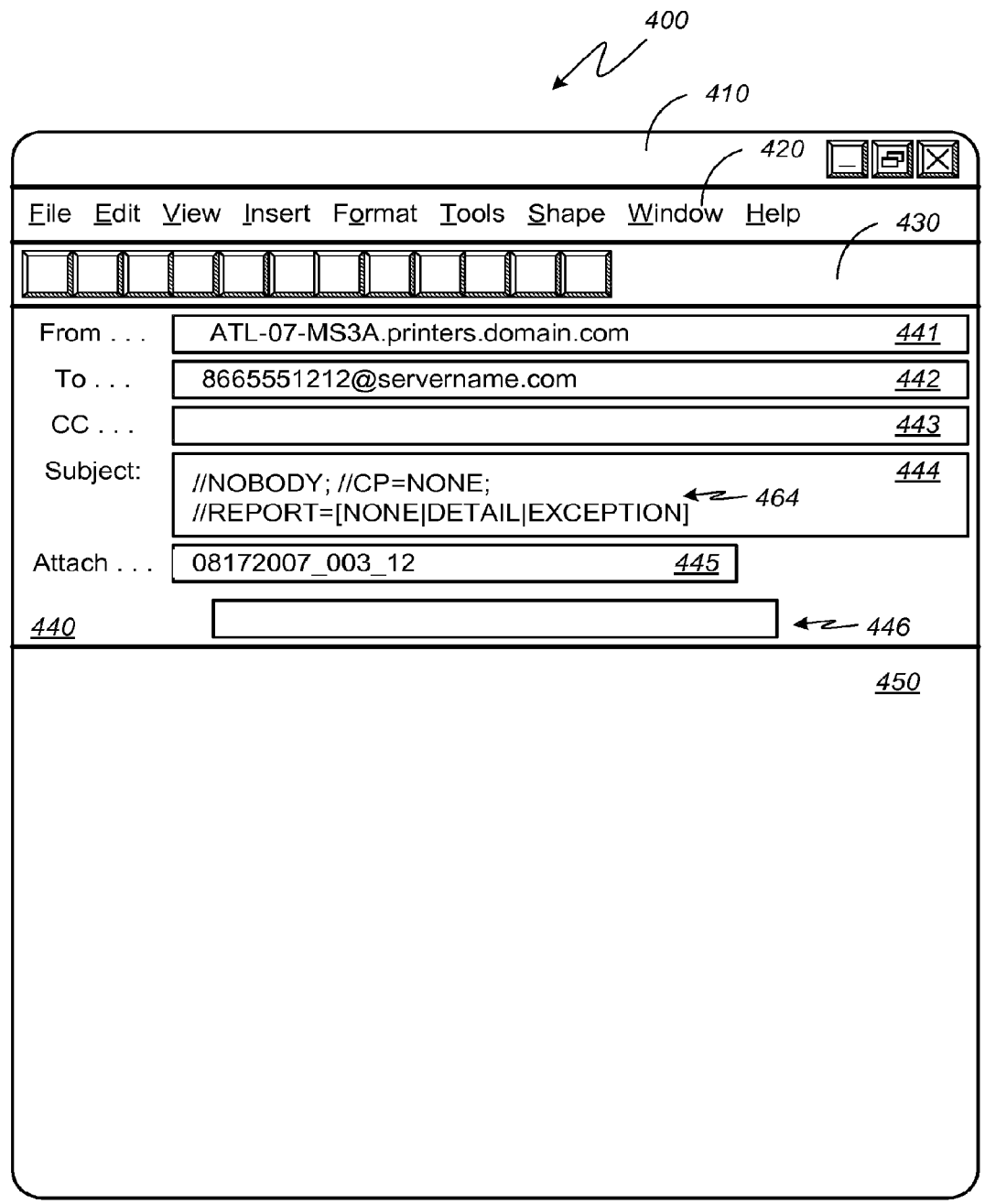
FIG. 4 is a functional block diagram illustrating an embodiment of an e-mail message.

FIG. 4 is a schematic diagram illustrating an embodiment of an example e-mail message 400 as rendered on a display device. The e-mail message 400 includes title bar 410, drop-down-menu bar 420, task bar 430, header 440, and body 450. Title bar 410 is arranged across the top of message 400. Title bar 410 includes pushbuttons arranged left-to-right that when selected minimize, resize, and close the message application window, respectively. Title bar 410 may include an alphanumeric title (not shown) to identify the e-mail message from other e-mail messages. Drop-down menu bar 420 includes a set of alphanumeric titles for respective drop-down menus commonly available in graphical user interfaces.

Task bar 430 includes a set of pushbuttons arranged left-to-right that when selected perform a respective operational task, open a tool, configure various application parameters, etc. As is known, each of the pushbuttons may be labeled with an icon indicative of the associated operation, tool, or configuration item to be manipulated.

Header 440 includes a set of data entry fields and a configuration or edit panel. Specifically, header 440 includes "from" field 441, "to" field 442, "CC" field 443, "subject" field 444 and "attachment" field 445. Each of "from" field 441, "to" field 442, "CC" field 443, "subject" field 444 and "attachment" field 445 are configured to receive and/or display alphanumeric strings. "From" field 441 is arranged to receive and display a first alphanumeric string that identifies the source of the message in message body 450. "To" field 442 is arranged to receive and display a second alphanumeric string that identifies an intended destination for the message in message body 250. "CC" field 443 is arranged to receive and display a third alphanumeric string that identifies additional parties or destinations that are to receive a copy of the message in message body 250. "Subject" field 444 is arranged to receive and display a fourth alphanumeric string that discloses what the message in message body 450 concerns. "Attachment" field 445 is arranged to receive and display a fifth alphanumeric string that includes a filename of one or more files attached to the e-mail message 400. Header 440 further includes task/configuration bar 446, which includes a set of pushbuttons labeled with icons indicative of an associated task that is performed when the pushbutton is active and selected. For example, task/configuration bar 446 may include pushbuttons associated with print, save, edit (including cut, copy and paste selected text strings) and formatting tasks.

In the illustrated embodiment, "from" field 441 includes a string of sub-strings separated by three instances of a period. The first sub-string, "ATL-07-MS3A," identifies the location of the source MFP that generated the e-mail message. The second sub-string, "printers," indicates that the MFP is capable of printing files and is coupled to the customer network 60 (FIG. 1). The third sub-string, "domain," indicates the name of the customer's network domain. The fourth sub-string, "com" reveals the extension of the address of the MFP. The "to" field includes a string of sub-strings identifying an e-mail address. The first sub-string, "8665551212," includes the destination phone number associated with the intended recipient of the fax message. The second sub-string, "servername," reveals the domain name of the translator that will process the message. The third sub-string, "com" reveals the extension of the address associated with the translator 120. The "attachment" field 445 includes a string that represents the filename of the file attached to the e-mail message. The illustrated filename indicates that the file was generated on Aug. 17, 2007. The file was generated as the result of the third scanned document processed on that day and includes 12 pages "Subject" field 444 includes three strings separated by semicolons. The first of the strings, "//NOBODY" is a command that directs the translator 120 to ignore any information in the body 450 of e-mail message 400. The second string, "//CP=NONE," is a command that directs the translator 120 to omit a coversheet from the outgoing fax message. The third string, "//REPORT=[NONE|DETAIL|EXCEPTION]," is used to direct the translator 120 how to report fax delivery. Additional and alternative encoded instructions can be easily enabled to instruct the translator 120 to use information in the body 450 to generate and format a cover sheet to be inserted into the outgoing fax message.

Generally, in terms of hardware architecture, the above-described MTA 110, translator 120 and SMTP server 261 each include respective processors and memories, as well as local and external interfaces. Each respective combination is arranged such that the processor is in communication with the memory via the local interface. The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, power and/or data connections to enable appropriate communications among the aforementioned components.

The respective processors are hardware devices for executing software, particularly that stored in the associated memory devices. The processors can be any custom made or commercially available processor configured to execute software instructions.

The respective memories can include any one or a combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM), hard drive, tape, compact disk read-only memory (CD-ROM), etc.). Moreover, the respective memories may incorporate electronic, magnetic, optical, and/or other types of storage media. Each memory can have a distributed architecture, where various components are situated remote from one another, but still accessible via the associated processor One or more programs, each of which comprises an ordered listing of executable instructions for implementing logical functions can be stored in the respective memories. In addition, each of the memories may include an operating system that essentially controls the execution of the illustrated functions and perhaps additional functions such as scheduling, input-output control, file and data management, memory management, communication control and related services.

When implemented as source programs, the programs are translated via a compiler, assembler, interpreter, or the like, to operate properly in connection with the operating system.

The external interfaces perform signal conditioning and data format conversions to enable communication through one or both of wired and wireless networks. Wired interfaces are compatible with Ethernet standards and TCP/IP. Wireless interfaces are compatible with one or more of the infrared data association (IrDA) and the Institute of Electrical and Electronics Engineers (I.E.E.E.) 802 family of wireless data communication protocols. It should be understood that other data-network interfaces compatible with other communication standards and protocols may also be used.

Additional interfaces and mechanisms can be coupled to each of the MTA 110, translator 120, and SMTP server 261 to configure these devices. These mechanisms may include browsers or other software (not shown) configured to expose configuration parameters, data tables and other information to external devices. Moreover, the local interface can be configured with one or more man-machine interfaces such as a keyboard, a display, a printer, etc. Such human-machine interfaces may include touch sensitive displays or the combination of a graphical-user interface and a controllable pointing device such as a mouse to enable an operator to configure or otherwise modify MTA 110, translator 120 or SMTP server 261 gateway 121 and gateway 122.

When instructions and data elements are implemented in software it should be noted that these software elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where one or more of instructions operable within MTA 110, translator 120 and SMTP server 261 are implemented in hardware, the instructions can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), etc.

Figure 5:
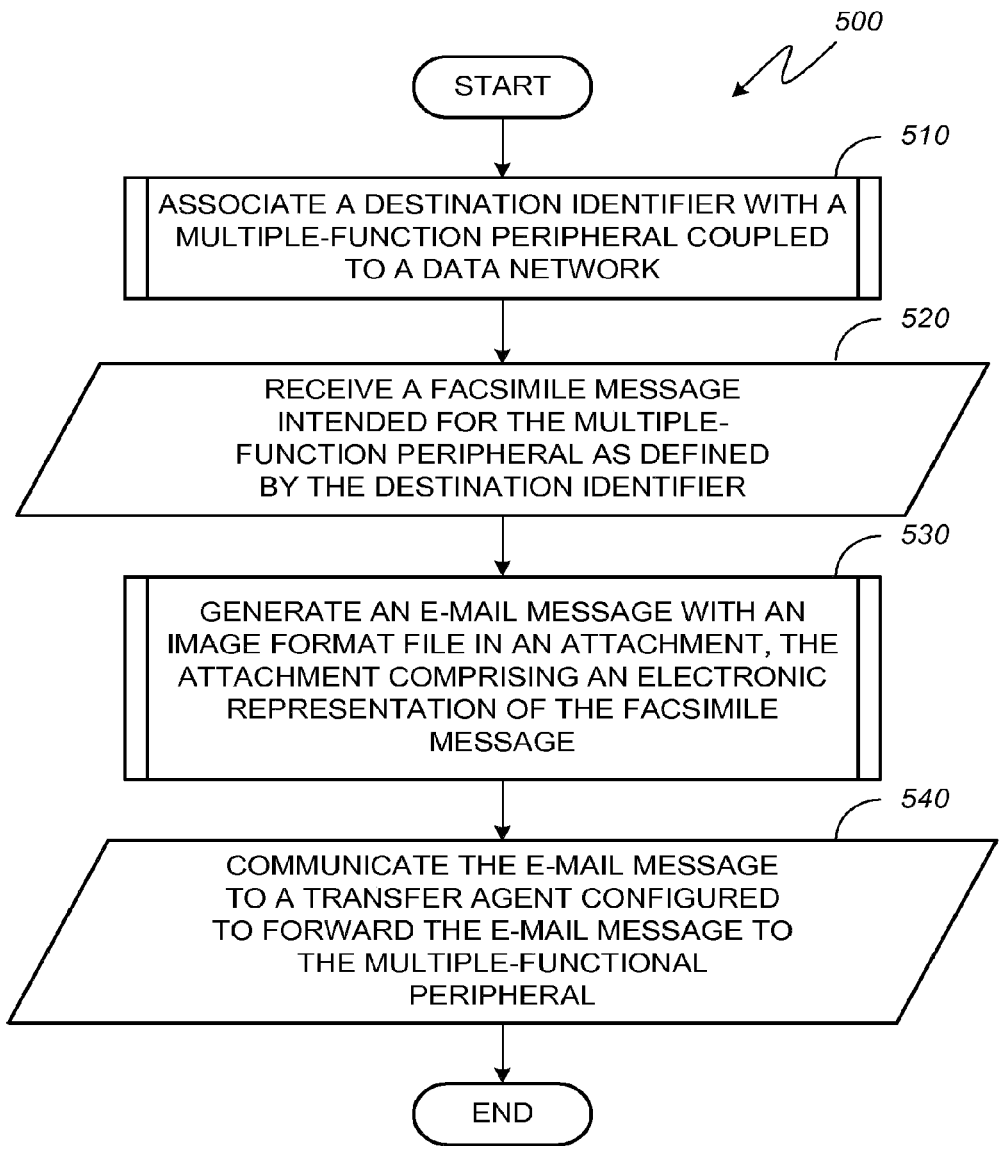
FIG. 5 is a flow diagram illustrating an embodiment of a method for communicating documents.

FIG. 5 is a flow diagram illustrating an embodiment of a method for communicating documents. The flow diagram of FIG. 5 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 500 begins with block 502 where a destination identifier is associated with a specific MFP coupled to a data network. Thereafter, as shown in input/output block 520, a fax message intended for the MFP as defined by the destination identifier is received. Upon receipt of the fax, an e-mail message is generated with an image format file attachment as shown in block 530. As further indicated in block 530 the attachment includes an electronic representation of the fax message. Next, as shown in input/output block 540, the e-mail message is communicated to a transfer agent configured to forward or relay the e-mail message to the MFP.

Figure 6:
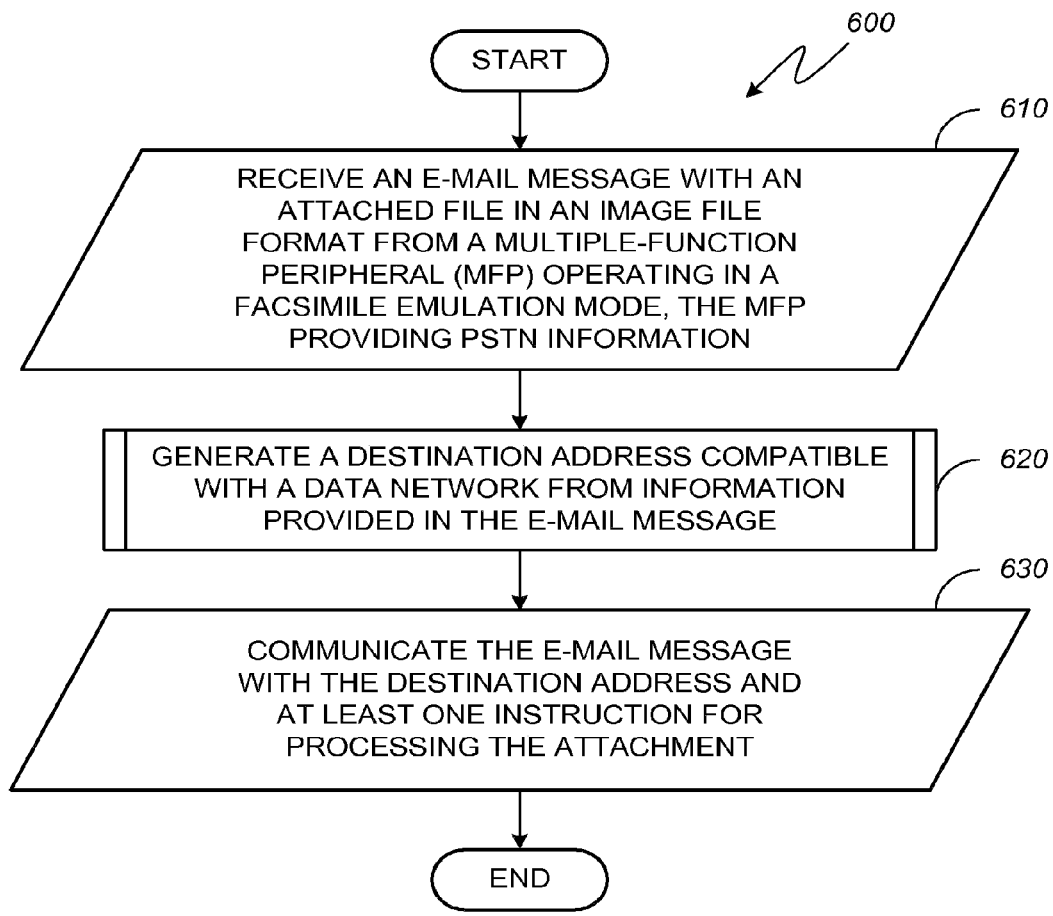
FIG. 6 is a flow diagram illustrating an embodiment of a method for processing documents

FIG. 6 is a flow diagram illustrating an embodiment of a method for processing documents. The flow diagram of FIG. 6 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 600 begins with input/output block 610 where an e-mail message including an attachment in an image file format is received from a MFP operating in facsimile mode, the MFP providing PSTN information in the e-mail message. Thereafter, as shown in block 620, a destination address compatible with a data network is generated in accordance with information provided in the e-mail message. Next, as shown in input/output block 630, the e-mail message is communicated along with the destination address and at least one instruction for processing the attachment.

As described above, the flow diagrams of FIGS. 4 and 5 show the architecture, functionality and operation of an implementation of example methods for communicating documents. The described functions can be embodied in source code including human-readable statements written in a programming language or machine code that comprises instructions recognizable by a suitable execution system such as a processor in a computer system. The machine code may be converted from the source code, etc. If embodied in hardware, each block may represent a circuit or a number of interconnected circuits to implement the specified logical function(s).

The foregoing description has been presented for purposes of illustration and description. It is not intended to be exhaustive or to limit the scope of the claims to the precise forms disclosed. Modifications or variations are possible in light of the above teachings. The embodiments discussed, however, were chosen and described to enable one of ordinary skill to utilize various embodiments of the present systems and methods. All such modifications and variations are within the scope of the appended claims when interpreted in accordance with the breadth to which they are fairly and legally entitled.

We claim:

1. A method for communicating documents, comprising:
   receiving an image file from a multiple-function peripheral emulating a facsimile mode, wherein the multiple-function peripheral provides identifying information, and public-switched telephone network information;
   generating an e-mail message including the identifying information, the public-switched telephone network information, and an image format file in an attachment;
   generating a destination address compatible with a data network from information provided in the e-mail message;
   communicating, to a server, the e-mail message with the destination address and at least one instruction for processing the attachment as an outgoing facsimile; and
   returning a delivery confirmation of the outgoing facsimile using the identifying information.

2. The method of claim 1, wherein the attachment is in tagged image file format (TIFF) or portable document format (PDF).

3. The method of claim 1, wherein generating a destination address comprises appending a domain identifier associated with the server to a username or appending a domain identifier associated with the server to a username and replacing the username with a destination phone number.

4. The method of claim 1, further comprising: encoding a command in a subject field or encoding information in the body of the e-mail message.

5. The method of claim 1, wherein the identifying information comprises the identity of the multiple-function peripheral or the identity of a user.

6. A system for communicating documents, comprising:
   a public-switched telephone network (PSTN) interface in communication with the PSTN;
   a packet-switched network interface communicatively coupled to a simple mail transfer protocol server via a message transfer agent; and
   a translator communicatively coupled to the PSTN interface and the packet-switched network interface, the translator configured to receive outgoing e-mail messages originating from a multiple-function peripheral via the message transfer agent, the outgoing e-mail messages including identifying information and having an image format file in an attachment, the translator further configured to remove and deliver the attachment in a facsimile format in accordance with one or more encoded commands in the outgoing email message and deliver a confirmation using the identifying information.

7. The system of claim 6, wherein the message transfer agent inserts a destination phone number as entered by a user of the multiple-function peripheral in an e-mail address, inserts a source identifier associated with the multiple-function peripheral, or inserts a source identifier associated with the operator of the multiple-function peripheral.

8. The system of claim 7, wherein the source identifier associated with the operator of the multiple-function peripheral comprises a user account.

9. The system of claim 6, wherein the message transfer agent relays an incoming e-mail message with an image format file attachment to an identified multiple-function peripheral and wherein the identified multiple-function peripheral discards the email message and generates a hard-copy representation of the information in the image format file.

* * * * *